US012194455B2

(12) United States Patent
Rethwisch

(10) Patent No.: US 12,194,455 B2
(45) Date of Patent: Jan. 14, 2025

(54) PIPETTE TIP

(71) Applicant: Eppendorf AG, Hamburg (DE)

(72) Inventor: Hanna Rethwisch, Hamburg (DE)

(73) Assignee: Eppendorf AG, Hamburg (DE)

( * ) Notice: Subject to any disclaimer, the term of this patent is extended or adjusted under 35 U.S.C. 154(b) by 910 days.

(21) Appl. No.: 17/058,923

(22) PCT Filed: Feb. 21, 2019

(86) PCT No.: PCT/EP2019/054353
§ 371 (c)(1),
(2) Date: Nov. 25, 2020

(87) PCT Pub. No.: WO2019/228682
PCT Pub. Date: Dec. 5, 2019

(65) Prior Publication Data

US 2021/0213441 A1 Jul. 15, 2021

(30) Foreign Application Priority Data

May 31, 2018 (EP) .................................... 18175333

(51) Int. Cl.
*B01L 3/02* (2006.01)

(52) U.S. Cl.
CPC ..... *B01L 3/0279* (2013.01); *B01L 2200/0689* (2013.01); *B01L 2300/0858* (2013.01)

(58) Field of Classification Search
CPC ........... B01L 3/0279; B01L 2200/0689; B01L 2300/0858
See application file for complete search history.

(56) References Cited

U.S. PATENT DOCUMENTS

| | | | |
|---|---|---|---|
| 6,197,295 | B1 | 3/2001 | Hsia et al. |
| 6,568,288 | B2 | 5/2003 | Rainin et al. |

(Continued)

FOREIGN PATENT DOCUMENTS

| | | | |
|---|---|---|---|
| CN | 103170386 | A | 6/2013 |
| CN | 204522998 | U | 8/2015 |

(Continued)

OTHER PUBLICATIONS

Eppendorf SE; EP 19705205.3; Filing Date Feb. 21, 2019; Office Action; dated Jun. 2, 2023 (4 pages).

(Continued)

*Primary Examiner* — Jill A Warden
*Assistant Examiner* — Michael Stanley Gzybowski
(74) *Attorney, Agent, or Firm* — Barclay Damon LLP

(57) ABSTRACT

A pipette tip comprises a tubular body including an inner circumference and an outer circumference. The tubular body comprises a bottom opening defined at a bottom end of the tubular body and a top opening defined at a top end and configured to clamp onto an attachment of a pipetting device. A seat region is positioned proximate the top opening on the inner circumference and configured to engage an attachment of a pipetting device. At least one groove is defined on the outer circumference. The tubular body is configured to plastically expanded in a radial direction within the at least one groove upon mounting the seat region on the attachment. The attachment comprises a larger diameter than at least part of the seat region to form an interference fit between the attachment and the at least part of the seat region when the pipette tip is clamped onto the attachment.

19 Claims, 12 Drawing Sheets

(56) References Cited

U.S. PATENT DOCUMENTS

| | | | | |
|---|---|---|---|---|
| 6,967,004 | B2 | 11/2005 | Rainin et al. | |
| D691,282 | S | 10/2013 | Motadel et al. | |
| 2002/0094302 | A1* | 7/2002 | Taggart | B01L 3/0275 425/542 |
| 2009/0317303 | A1* | 12/2009 | Belz | B01L 3/0275 422/400 |

FOREIGN PATENT DOCUMENTS

| | | | | |
|---|---|---|---|---|
| CN | 207042376 | U | 2/2018 | |
| EP | 2138234 | A1 | 12/2009 | |
| EP | 2606977 | A1 | 6/2013 | |
| EP | 3115110 | A1 | 1/2017 | |
| IN | 3542MUM2012 | A | 4/2014 | |
| WO | WO-2011091308 | A2 * | 7/2011 | B01L 3/0275 |

OTHER PUBLICATIONS

Eppendorf AG; CN 201980036758.1; Filing Date May 31, 2018; First Office Action; dated Dec. 29, 2021 (8 pages).
Eppendorf AG; CN 201980036758.1; Filing Date May 31, 2018; English Translation of First Office Action; dated Dec. 29, 2021 (10 pages).
Eppendorf AG; PCT/EP2019/054353; International Filing Date Feb. 21, 2019; International Search Report and Written Opinion; dated April 2. 2019 (13 pages).
Eppendorf AG; PCT/EP2019/054353; International Filing Date Feb. 21, 2019; English Translation of International Search Report; dated Apr. 2, 2019 (2 pages).

* cited by examiner

A
A

100µl
20µl

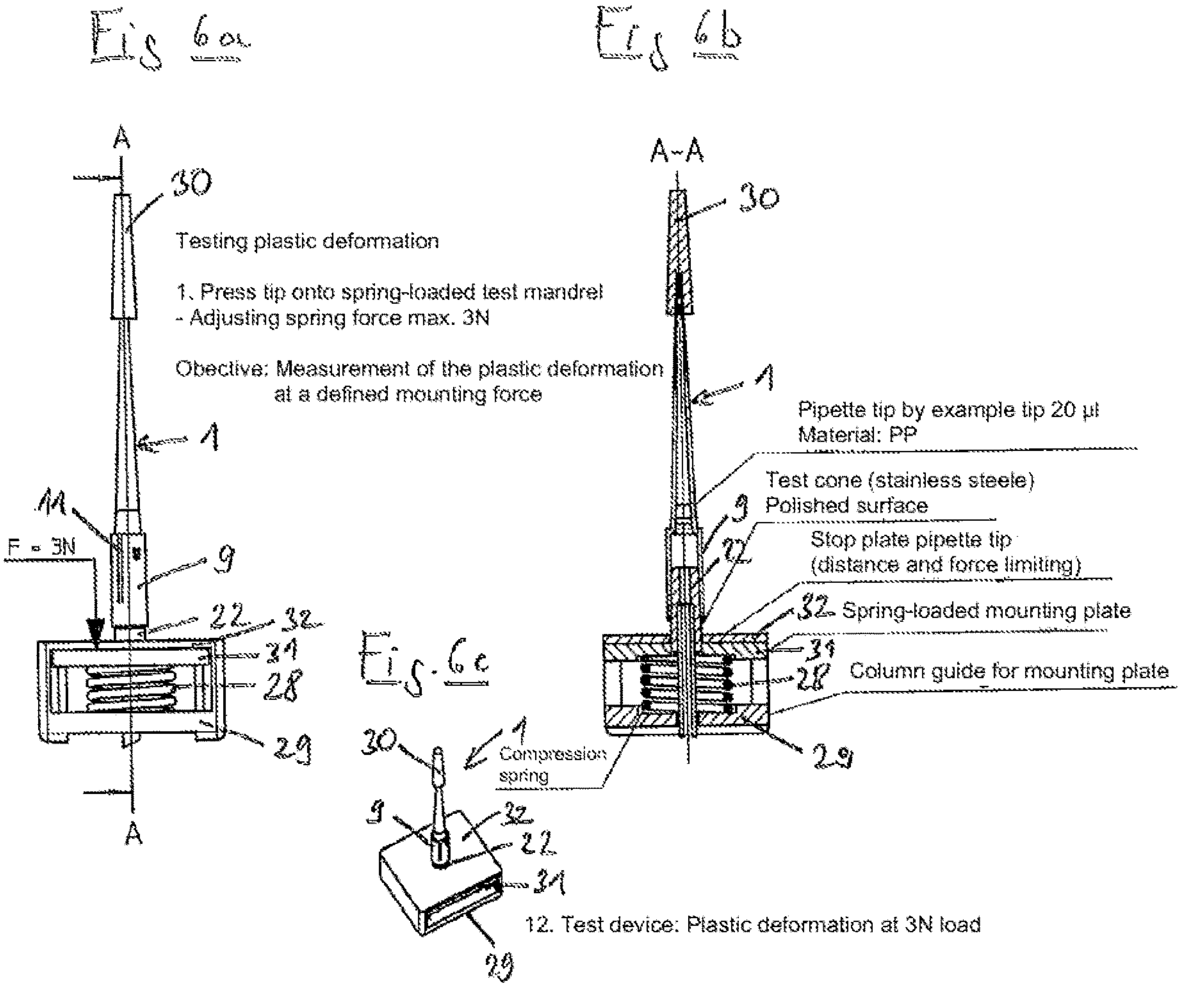
Fig 6a
Fig 6b
Fig. 6c
A
30
Testing plastic deformation
1. Press tip onto spring-loaded test mandrel
- Adjusting spring force max. 3N
Obective: Measurement of the plastic deformation
at a defined mounting force
1
11
F = 3N
9
22
32
31
28
29
A
A-A
Pipette tip by example tip 20 µl
Material: PP
Test cone (stainless steele)
Polished surface
Stop plate pipette tip
(distance and force limiting)
Spring-loaded mounting plate
Column guide for mounting plate
Compression spring
12. Test device: Plastic deformation at 3N load 5
16
15
18
19
20
21
2
3
6
4
9
8
10
1
7

33
11

11.1 c
d

PIPETTE TIP

CROSS REFERENCE TO RELATED INVENTION

This application is a national stage application pursuant to 35 U.S.C. § 371 of International Application No. PCT/EP2019/054353, filed on Feb. 21, 2019, which claims priority to, and benefit of, European Patent Application No. 18 175 333.6, filed May 31, 2018, the entire contents of Which are hereby incorporated by reference.

BACKGROUND

Pipette tips are used together with pipettes and other metering devices in particular in medical, biological, biochemical and chemical laboratories for metering liquids. In the following, pipettes and other metering devices will be jointly termed "pipetting devices." Pipette tips have an elongated tubular body that has a bottom opening in the bottom end for the passage of liquid, and a top opening in the top end for clamping onto the attachment of a pipetting device. Pipette tips usually have a generally conical shape whose cross-section enlarges from the bottom opening toward the top opening. Standardized conical, or respectively frustoconical attachments (working cone) are known with a standard geometry that is uniformly used by many manufacturers and that is characterized for each pipette tip size by a specific average diameter and by a specific cone angle of the conical attachment.

Multichannel pipetting devices serve to simultaneously draw liquid from one or more vessels, or respectively to discharge liquid into one or more vessels. They are frequently used to process microliter plates that have a plurality of vessels in a matrix-like arrangement. To accomplish this, multichannel pipetting devices have several conical attachments arranged parallel next to each other in one or more parallel rows onto which the pipette tips can be clamped. Multichannel pipettes with 16 or 24 attachments in a row are known in an adaptation of a frequently used format of microtiter plates with 384 (16×24) vessels (wells) according to the ANSI standard. Multichannel metering devices with a metering head that has 384 attachments are also known. Corresponding to the spacing of adjacent vessels of microtiter plates with 384 vessels, adjacent attachments have a spacing of 4.5 mm from each other.

When designed as an air cushion pipetting device, the pipetting device has at least one displacement apparatus for air which connects communicatingly to a through-hole of at least one attachment. An air cushion is displaceable by means of the displacement apparatus in order to draw liquid into a pipette tip clamped onto the attachment and eject it therefrom. The displacement apparatus is generally designed as a cylinder with a plunger that is movable therein. However, displacement apparatuses are also known with a displacement chamber and at least one deformable wall, wherein a deformation of the wall causes the displacement of the air cushion.

In the embodiment as a direct displacement pipetting device, a small plunger is arranged in the pipette tip that, when the pipette tip is being mounted on an attachment, is coupled to a coupling element of a plunger drive of the pipetting device that is displaceable in a through-hole in the attachment.

The liquid is preferably drawn into the pipette tip in a single step or in several small steps. The liquid is dispensed in a single step when pipetting, and discharged in several small steps when dispensing.

Pipetting devices generally have an ejector that acts can the top edge of the pipette tip in order to press it off of the attachment. With multichannel pipetting devices, the ejector can simultaneously be pressed against the top edges of several pipette tips. By means of the ejector, the user can disconnect pipette tips contaminated with liquid from the attachment without grasping them.

The pipetting device can be a manual pipette that the user can hold and actuate with just one hand. It can also be a metering station ("pipetting station") or a metering machine ("pipetting machine") in which a metering head with one or more attachments is displaceable on a robot arm or on another transfer system above a work surface. The pipetting device can also be part of a laboratory machine ("workstation") that can perform additional treatments of liquid (such as mixing, heating and analyzing) in addition to metering.

To prevent metering, the pipette tip must he clamped anti the attachment sufficiently securely, or respectively sealingly. Moreover, the forces for mounting and ejecting the pipette tip onto/off of the attachment may not be too high. Conventional pipette tips are thick-walled and rigid in the contact region with the conical attachment. While being mounted, the pipette tips are elastically expanded at the circumference by the attachment. The spring characteristic is steep so that high mounting forces must be applied. After mounting, a correspondingly high static friction acts between the attachment and the pipette tip that must be overcome during ejection. The user is stressed by the high forces for mounting and ejecting the pipette tip. This can trigger disorders that are summarized under the term "cumulative trauma disorders" (CTD). If mounting and ejection are performed by motorized drives, they must be correspondingly powerful and have a high-power consumption.

U.S. Pat. No. 6,197,295 describes a pipette tip that can be mounted securely onto an attachment of a pipette by applying relatively low axial mounting forces of 6 pounds (26.7 N), and can be ejected therefrom by applying relatively low ejection forces of 3 pounds (13.3 N). The pipette tip has a conical top end with an inner diameter at the top end that is greater than the diameter of the attachment of the pipette onto which the pipette tip is to be mounted. Furthermore, the pipette tip has a hollow middle section and an annular sealing region at the connection between the top end and the middle section. The middle section has a side wall on and next to the sealing region with a wall thickness between. 0.2 and 0.5 mm. The annular sealing region has an inner diameter that is less than a value "x" and is designed so that it engages with the bottom end of a sealing zone of the attachment in order to be radially expanded when the attachment is inserted. This creates a liquid-tight seal between the sealing zone of the attachment and the sealing region of the pipette tip. Furthermore, on the inside next to the sealing region, the pipette tip has lateral stabilization means that engage with the outer surface of the attachment in order to stabilize the pipette tip on the attachment. The lateral stabilization means have at least three contacts at a distance from each other in the circumferential direction or radial direction which extend inward from the inner surface of the pipette tip. The diametrical distance between the contacts is dimensioned so that it easily engages with the bottom end of the attachment and enables the bottom end to slide past without expanding the side walls of the pipette tip on which the contacts are arranged.

When the bottom end of the scaling zone of the attachment engages with the sealing region of the pipette tip, the pipette tip is stretched in the sealing region and directly adjacent thereto. When the contacts guide the pipette tip on the attachment, the side wall of the pipette tip deforms inwardly between the contacts and is not expanded which minimizes the force to be applied for pressing on the attachment. The attachment can be pressed deeper into the pipette tip as the mounting force increases. Accordingly, high ejection force must be applied to disengage the pipette tip from the attachment. Given the inwardly projecting contacts, the construction is only suitable for comparatively large pipette tips.

U.S. Pat. No. 6,568,288 describes a pipette tip that has annular sealing regions that are axially spaced from each other and substantially cylindrical lateral guide regions, wherein the sealing region is sufficiently thin to form a press fit and airtight seal between a sealing surface of the sealing zone and the sealing region upon penetration of an attachment of a pipette with annular sealing zones that are axially spaced from each other and cylindrical lateral guide zones. The wall thickness in the sealing region is preferably between 0.2 and 0.5 mm. The sealing surface is the outer surface of an annular projection that projects radially outward next to the bottom end of the attachment. The pipette tip has an annular upwardly facing and inwardly directed shoulder on the inner circumference in order to restrict the mounting on the attachment. The force should be approximately 2 pounds (8.9 N) for mounting, and approximately 1 pound (4.45 N) for ejecting. By means of the depth stop, incomplete insertion can occur while simultaneously picking up several pipette tips from a tray or rack by means of a multichannel pipetting device. If the tray or rack sags downward slightly between side edges, mounting the two outer attachments on the shoulders of the two outer pipette tips can result in insufficient insertion of the other attachments into the pipette tips arranged therebetween.

U.S. Pat. No. 6,967,004 B2 describes a pipette tip that has an annular sealing region with an inner sealing surface on a side wall that is thin enough in the sealing region to expand slightly and form a press fit and an airtight seal between the sealing surface and a sealing zone of an attachment of the pipette inserted into the pipette tip. The pipette tip has an annular shoulder that faces inward and upward which restricts the insertion of the attachment. The attachment has two cylindrical sections with different diameters, its annular sealing zone encloses a sealing edge at a connection between the bottom end of a cylindrical section and the outermost edge of a radially extending transition of the attachment. Preferably, the forces for inserting and ejecting the pipette tip are less than 2 pounds (8.9 N). The depth stop can lead to incomplete insertion of attachments while simultaneously picking up several pipette tips by means of a multichannel pipetting device.

EP 2 138 234 A1 describes a pipette tip that has a flexible, tubular connecting section with a contour having a wave-shaped cross-section which increases the elasticity of the seat region for releasably connecting to the attachment of a pipetting device at the top end of an elongated, tubular section. The seat region is reversibly expandable by more than 20% while being mounted on the attachment. To achieve a sealing seat, the wave-shaped contour must be stretched smooth on the attachment, as a result of which the additional elasticity is only slight. Consequently, precise production of the pipette tip is required. Furthermore, a shoulder that projects radially inward is present between the seat region and tubular region and creates a depth stop for the attachment that can lead to insufficient insertion of attachments while pipette tips are being picked up by means of a multichannel pipetting device.

EP 2 606 977 A1 describes a pipette tip with the shape of an elongated tube having a bottom opening in the bottom end for the passage of liquid, and a top opening in the top end, wherein a seat region is present on the inner circumference next to the top opening and serves to be mounted on a standardized conical attachment of a pipetting device. The seat region has a holding region with axially extending ribs that project radially inward, and a sealing region below the holding region with an inwardly projecting sealing region running around the circumference. The seat region is designed so that, while being mounted on the attachment with an attachment force which ensures that the pipette tip is held and sealed on the attachment, the ribs are partially deformed plastically, and an elastic deformation occurs outside the ribs in the seat region. Below the sealing region, it has a braking region that expands conically toward the top opening to restrict the mounting. This ensures a safe seal on the attachment of a pipetting device and significantly reduces the ejection force to be applied for ejection. The construction is particularly suitable for comparatively large pipette tips with 2.5, 5.0 and 10 mL nominal volumes. For smaller pipette tips, it is less well suited given the difficult production of the delicate ribs.

EP 3 115 110 A1 describes a pipette tip with a tubular body and a seat region for being mounted on a conical attachment of a pipetting device that has a circumferential, inwardly projecting sealing projection on the inner circumference at a distance from the top opening, a circumferential braking region below the sealing projection that tapers downward more strongly than the attachment, and a circumferential, inwardly projecting supporting projection above the sealing projection. The sealing projection can be sealingly clamped onto the attachment under elastic deformation, wherein the braking region lies further below against the attachment, and the supporting projection lies further upward against the attachment without initial tension, or is at a distance from the attachment across a circumferential gap. The pipette tip can be clamped in an effectively sealing manner and tightly onto the attachment of a pipetting device, is electable from the attachment with reduced exertion of force, and is also highly suitable for smaller pipette tip sizes. A disadvantage is the still high exertion of force when clamping onto the attachment and when slipping off of the attachment.

WO 2011/091308 A2 describes a pipette tip that has an annular flange on the proximal end of a proximal section and axially facing ribs in the proximal section that are at a distance from each other in the circumferential direction. The flange is to increase the rigidity of the pipette tip and facilitate the alignment of the dispenser on the pipette tip. The ribs are to limit the axial expandability of the pipette tip in the proximal region. The mounting forces of the pipette tips with 200 μl and 1,000 μl fill volumes on five different pipettes are more than 1,000 g (10 N).

Against this backdrop, the invention is based on the object of providing a pipette tip that can be clamped onto an attachment of a pipetting device with reduced mounting force so that it is held sufficiently tightly, or respectively sealingly, and so that it can be released from the attachment with less ejection force. The pipette tip should be suitable for use with a multichannel pipetting device.

BRIEF SUMMARY OF THE INVENTION

An embodiment of a pipette tip comprised of plastic comprises an elongated, tubular body with a bottom opening in the bottom end for the passage of liquid and a top opening in the top end for clamping onto an attachment of a pipetting device. A seat region for the attachment is present on the inner circumference next to the top opening. At least one groove extending in the axial direction is present in the outer circumference, and the tubular body is configured so that it is plastically expanded in the circumferential direction within the groove upon mounting the pipette tip with a maximum mounting force of 5 N, preferably of 3.3 N, more preferably 3 N, by the seat region on an attachment. The attachment comprises a larger dimension than at least part of the seat region so that it forms an interference fit with at least part of the seat region when the pipette tip is clamped onto the attachment, whereby the pipette tip is sealingly held tight on the attachment.

The tubular body is weakened in the seat region by the groove so that the seat region is plastically expandable in the circumferential direction within the groove by clamping onto the attachment of a pipette device. The attachment is configured so that the pipette tip can be clamped by the seat region onto the attachment. To accomplish this, the attachment has a larger dimension than at least part of the scat region so that it forms an interference fit (press fit) at least with part of the seat region when the pipette tip is clamped onto the attachment. The plastic deformation within the groove arises because sufficiently high stress arises in the wall section of the tubular body within the groove upon mounting on the attachment so that the elasticity limit is exceeded, and plastic deformation occurs. The plastic deformation is an irreversible deformation, i.e., a deformation that does not independently reverse after removing the pipette tip from the attachment in the circumferential direction next to the groove, the tubular body has a greater wall thickness than within the groove. As a consequence, it is not plastically deformed next to the groove when the plastic deformation occurs within the groove. This can minimize the mounting force. The inner diameter of the tubular body is permanently enlarged from the plastic deformation within the groove. If the pipette tip is clamped onto the attachment so that it is plastically expanded within the groove in the circumferential direction, the pipette tip is sealingly held tight on the attachment. The plastic deformation limits the mounting force to values at which the pipette tip sits sufficiently tightly, or respectively sealingly on the attachment. This minimizes the mounting force and the ejection force needed to eject the pipette tip. With the pipette tip according to the invention, the mounting and ejection forces for mounting a pipette tip on an attachment and ejecting the pipette tip from the attachment are limited to a value of 5 N, preferably of 3.3 N, and more preferably 3 N. The mounting force is introduced vertically into the pipette tip. In so doing, a specific mounting force (of for example 5 N, 3.3 N or 3 N) can be introduced into the pipette tip by pressing it vertically onto an also vertically oriented attachment that is supported by a spring against an abutment, wherein the spring is dimensioned so that it compresses upon reaching the specific mounting force. The attainment of the mounting force is indicated by the compression. Since the pipette tip can function without a depth stop, several pipette tips can be picked up by means of a multichannel pipetting device such that the attachments extend deep enough into all the pipette tips for a secure and sealing seat without the mounting three rising significantly. According to a preferred embodiment, the pipette tip does not have a brake region, or a brake region that, as a “soft” depth stop, gradually brakes the attachment While being inserted into the pipette tip. The pipette tip is particularly suitable for use with a multichannel pipetting device with 16, 24, 384 or any other number of channels. The pipette tip is particularly suitable for the provision of several pipette tips on a tray or rack with a distance between adjacent pipette tips of 4.5 mm for being simultaneously picked up by means of a multichannel pipetting device. The pipette tip is therefore particularly suitable for drawing and dispensing liquids from or into a microliter plate with 384 vessels.

The plastic expansion in the circumferential direction can occur everywhere within the groove, or can be limited to a section within the groove. The plastic expansion in the circumferential direction within the groove is determined by the shape and dimensions of the tubular body, the shape and dimensions of the groove, and the plastic of the pipette tip. In particular, the plastic expansion can be ascertained by marking the ends of a section within the groove running in the circumferential direction and measuring the section before and after mounting the pipette tip with the given maximum mounting force on the given attachment. The ends of the section can in particular be marked by the lateral edges of a line that is applied in an axial direction within the groove with a defined line width by means of a technical pen or fineliner. It is furthermore possible to ascertain the plastic deformation by comparing the dimensions of the groove or the base of the groove in a circumferential direction before and after the mounting on the attachment. The dimensions can in particular be measured with the assistance of a microscope.

According to one embodiment of the invention, the tubular body is designed so that it can be clamped by the seat region onto a conical attachment, or onto a conical section of the attachment. According to another embodiment, the smallest diameter of the conical attachment, the conical section of the attachment, is selected from the range of 2 mm to 1.5 mm, preferably from the range of 2.5 mm to 8 mm, more preferably from the range of 3 mm to 5 mm. According to another embodiment, the smallest diameter of the conical attachment or the conical section of the attachment is 3.34 mm. According to another embodiment, the cone angle of the conical attachment, or the conical section of the attachment, is selected from the range of 1.0° to 10°, preferably from the range of 1.3° to 7° mm more preferably from the range of 1.5° to 3°. According to another embodiment, the cone angle is 2.17°. According to another embodiment, the tubular body is configured to be mounted by the seat region onto a cylindrical attachment so that it expands plastically within the groove in the circumferential direction.

According to an embodiment, the tubular body is configured so that it can be clamped onto a conical attachment or conical section of the attachment, wherein the smallest diameter of the conical attachment or the conical section is 3.34 mm, and its cone angle is 2.17°.

According to another embodiment, the groove is configured so that it is plastically expanded in a strip-shaped section extending in the axial direction with a width of a maximum of 0.1 mm, preferably of a maximum of 0.02 mm, preferably 0.015 to 0.005 mm, and preferably 0.011 mm. In this embodiment, the plastic expansion can be checked by measuring the width of a line applied to the strip-shaped section by means of a technical pen or fineliner before and after the mounting on the attachment.

According to another embodiment, the groove is configured so that it expands plastically by at least 8% in one section.

According to another embodiment, the tubular body has a wall thickness of a maximum of 0.2 mm at the base of the groove, and/or a wall thickness of at least 0.25 mm in the circumferential direction next to the groove. The base of the groove is the point or the section of the groove at which the groove has the greatest depth in a horizontal cross-sectional plane through the tubular body. According to a preferred embodiment, the tubular body at the base of the groove has an overall wall thickness of a maximum of 0.2 mm. Preferably, pipette tips comprising at least a polyolefin, preferably consisting of at least a polypropylene (PP) and/or polyethylene (PE) that maintain this wall thickness can be plastically expanded within the groove in a circumferential direction while mounting with the specific maximum three on the specific attachment without being plastically expanded next to the groove.

According to another embodiment, the tubular body at the base of the groove has a wall thickness of at least 0.15 mm. This is advantageous for a sufficiently tight seat of the pipette tip on the attachment. According to another embodiment, the tubular body at the base of the groove has an overall wall thickness of at least 0.15 mm.

According to another embodiment, at its top end, the tubular body has another radially outwardly projecting and completely or partially surrounding projection as a ring flange.

According to another embodiment, the tubular body at the top section in which the groove is arranged is cylindrical or conical on the outside. According to another embodiment, the conical top section tapers downward on the outside of the tubular body. According to another embodiment, it has a cone angle of a maximum of 5°, preferably a maximum of 2°.

According to another embodiment, the groove extends from the top end of the tubular body downward. This can make the plastic deformation of the groove easier during mounting on an attachment and promote a sealing clamping of the pipette tip with slight mounting force.

According to a preferred embodiment, the tubular body has an overall wall thickness of at least 0.25 mm in the circumferential direction next to the groove. In this embodiment, the tubular body has an overall wall thickness outside the groove of at least 0.25 mm in any horizontal cross-sectional planes through the groove.

According to another embodiment, the tubular body has an inwardly projecting circumferential sealing bead on the inner circumference of the seat region. The sealing bead is advantageous for the tight and sealing seat of the pipette tip on an attachment. The mounting and ejection forces are reduced by the sealing bead. In this embodiment, the pipette tip is clamped onto an attachment that has a greater dimension than the sealing bead.

According to another embodiment, the tubular body has a wall thickness of a maximum of 0.2 mm and/or of at least 0.15 mm at the base of the groove in a horizontal cross-sectional plane through the sealing bead. This is advantageous for limiting the mounting and ejection forces by plastic deformation within the groove and for a sufficiently tight seat of the pipette tip on the attachment.

According to another embodiment, the groove has a first radius with the base of the groove at the lowest point in a horizontal cross-sectional plane through the tubular body. According to another embodiment, the flanks of the groove are directly connected to the first radius. According to another embodiment, the flanks of the groove are each connected by a second radius to the outer circumference of the tubular body.

According to another embodiment, the first radius is a maximum of 0.5 mm, and/or at least 0.1 mm, and preferably 0.25 mm.

According to another embodiment, the groove in the circumferential direction has a width of a maximum of 1.5 mm, and/or at least 0.25 mm, and preferably 0.8 mm.

According to another embodiment, the wall thickness of the tubular body in the circumferential direction next to the groove is at least 0.3 mm and/or a maximum of 0.4 mm. This saves material and nonetheless yields an advantageous pipette tip rigidity.

According to another embodiment, the sealing head is arranged at a distance from the top opening. This facilitates the introduction of the attachment into the pipette tip. To further facilitate the introduction, the pipette tip has an insertion chamfer at the top opening on the inner circumference. This has a conical contour that tapers toward the sealing bead.

According to another embodiment, the distance of the sealing bead from the top opening is at least 0.1 mm and or a maximum of 4.0 mm, for example 0.8 mm.

According to another embodiment, the insertion chamfer has a cone angle within a range of 5 to 25°, for example 16°.

According to another embodiment, the tubular body has several grooves in the Outer circumference. This can yield an even expansion and limitation of the mounting and ejection. forces. According to another embodiment, the grooves are evenly distributed over the outer circumference of the tubular body. According to another embodiment, precisely three grooves are present in the outer circumference of the tubular body.

According to another embodiment, the tubular body does not have a groove diametrically opposite an injection point, or has a groove whose top end is arranged below a sealing bead running around the inner circumference of the seat region. This embodiment is based on the insight that out-of-roundnesses can occur with greater frequency when injection molding the pipette tip of plastic when the entry point for the plastic into the cavity of the mold for producing the tubular body is arranged diametrically opposite the groove to be formed therein. Then the flow fronts flowing around both sides of the core of the injection mold starting from the entry point come together precisely in the region of the thinning of the wall thickness of the tubular body to be produced. The out-of-roundnesses can cause leaks. This is prevented according to the invention in that the tubular body is produced without a groove diametrically opposite the entry point of the plastic into the cavity, or with a groove whose top end is arranged lower than the entry point This is discernible in the finished pipette tip in that the pipette tip does not have a groove diametrically opposite the injection point, or has a groove whose top end is arranged lower than the injection point. The injection point is the visually perceptible (e.g., elevated or recessed) point on the outside of the pipette tip at which the plastic entered into the cavity. Preferably, the groove is arranged at least 1 mm, more preferably at least 2 mm, below the injection point.

If the pipette tip has several injection points that are arranged distributed over the circumference of the tubular body, care must accordingly be taken so that the flow fronts within the sealing bead do not meet radially to the inside of a groove. Therefore, according to another embodiment, the tubular body does not have a groove extending in an axial direction, or has a groove extending in an axial direction whose top end is arranged below a sealing bead running around the inner circumference of the seat region where, during injection molding, flow fronts of the plastic material meet starting from at least one injection point.

According to another embodiment, the tubular body is conical inside the seat region with a downwardly reducing diameter. This is advantageous for clamping onto a conical attachment. According to another embodiment, the seat region has a cone angle within a range of 1.5 to 2.5°, preferably 2°. The flat cone angle is advantageous for low friction clamping of the pipette tip onto an attachment. Preferably the attachment has a cone angle that exceeds the cone angle of the seat region, preferably of 1.5° to 3°, more preferably of 2°.

According to another embodiment, the tubular body has an inwardly projecting closed or sectionally circumferential guide structure on the inner circumference of the seat region below or above the sealing bead. "Guide structure" designates a closed or sectionally circumferential structure projecting on the inner circumference of the seat region that serves to laterally brace the pipette tip against an attachment inserted therein. According to another embodiment, the guide structure is a guide bead, or has several guide cams distributed in the circumferential direction. The guide structure laterally braces the pipette tip against the attachment so that the pipette tip does not tilt on the attachment, for example when dispensing liquid while the bottom end of the pipette tip contacts a wall of the vessel ("wall dispensing"), The guide structure is preferably dimensioned so that it lies against the attachment without pretension or is spaced from the attachment by a circumferential gap when the pipette tip is clamped onto the attachment. This minimizes the forces for mouthing the pipette tip on the attachment.

According to another embodiment, the guide structure has a distance from the sealing bead that corresponds to at least the inner diameter of the sealing bead. This is advantageous for guiding the pipette tip.

According to another embodiment, the sealing bead has an inner diameter of a maximum of 3.6 mm, preferably of 3.5 mm, and/or the guide structure has an inner diameter of a maximum of 3.5 mm, preferably of 3.4 mm.

According to another embodiment, the tubular body has a downwardly tapering conical brake region on the inner circumference of the seat region below the sealing bead, preferably below the guide structure. "Brake region" designates a downwardly tapering conical region on the inner circumference of the seat region and below the sealing bead that serves to gradually brake the attachment of a pipette tip when penetrating into the pipette tip. The brake region gradually brakes the attachment when penetrating into the pipette tip. According to a preferred embodiment, the brake region is present in addition to a guide structure. Alternatively, the brake region replaces the guide structure so that it guides the pipette tip on the attachment. According to another embodiment, the brake region has a cone angle of at least 5° and/or a maximum of 60°, for example 40°.

The groove extends in the axial direction at least beyond part of the height of the seat region. According to another embodiment, the groove extends beyond the overall height of the seat region in an axial direction. According to another embodiment, the groove does not extend beyond the seat region in an axial direction. According to another embodiment, the groove extends beyond the seat region in an axial direction. According to another embodiment, the groove extends upward and/or downward beyond the seat region in an axial direction. According to another embodiment, the groove extends beyond the sealing bead in an axial direction. According to another embodiment, the bottom end of the groove is arranged between the sealing bead and the guide structure. According to another embodiment, the groove extends beyond the guide structure in an axial direction. According to another embodiment, the bottom end of the groove is arranged at the height of the guide structure. According to another embodiment, the bottom end of the groove is arranged between the guide structure and the brake region. According to another embodiment, the groove ends at the height of the brake region. According to another embodiment, the groove extends beyond the brake region in an axial direction.

According to another embodiment, the pipette tip has a conical initial section, above which is a conical middle section with a lesser cone angle than the initial section, and above which is a cylindrical or conical head section, wherein if applicable a transitional section is present between the initial section and the middle section and has a greater cone angle than the initial section.

According to another embodiment, the at least one groove is arranged in the outer circumference of the head section and/or the seat region is arranged on the inner circumference of the head section. According to another embodiment, the groove extends beyond the overall height of the head section in an axial direction. According to another embodiment, the groove ends at the bottom end of the head section.

According to another embodiment, the pipette tip has a nominal volume of at most 120 μL, preferably 100 μL or 20 μL.

The pipette tip is preferably produced from a single or a number of different plastics.

According to another embodiment, the pipette tip is produced from at least one thermoplastic, preferably from at least one polyolefin, preferably from at least one polypropylene (PP) and/or polyethylene (PE).

Preferably, the pipette tip is produced from at least one plastic by being injection molded.

According to another solution to the object, the pipette tip of plastic according to the invention comprises an elongated, tubular body with a bottom opening in the bottom end for the passage of liquid and a top opening in the top end for clamping onto an attachment of a pipetting device, wherein a seat region for the attachment is present on the inner circumference next to the top opening, and at least one groove extended in the axial direction is present in the outer circumference, and the tubular body has a wall thickness of a maximum of 0.2 mm at the base of the groove and a wall thickness of at least 0.25 mm in the circumferential direction next to the groove.

Furthermore, the invention relates to a pipetting system comprising at least one pipette tip according to the invention or one of the above additional embodiments, and a single channel pipetting device with a single attachment for mounting a pipette tip and/or a multichannel pipetting device with several attachments for simultaneously mounting several pipette tips, wherein the multichannel pipetting device preferably has a metering head with 16, or 24, or 384 attachments.

According to another embodiment, the at least one attachment has at least one conical section, wherein the smallest diameter of this section is selected from the range of 2.0 to 15 mm, preferably 2.5 to 8 mm, more preferably 3 to 5 mm, more preferably 3.34 mm, and its cone angle is selected from the range of 1.0° to 10°, preferably from the range of 1.3° to 7°, more preferably from the range of 1.5 to 3°, preferably 2.17°.

BRIEF DESCRIPTION OF THE DRAWINGS

The invention is explained in greater detail below based on the accompanying drawings of four exemplary embodiments. In the drawings:

FIG. 6*a* illustrates a side view of an embodiment of the pipette tip with a nominal volume of 20 μL on a test device configured to check the plastic deformation;

FIG. 6*b* illustrates a longitudinal sectional view of the embodiment of FIG. 6*a;*

FIG. 6*c* illustrates a top perspective view of the embodiment of FIG. 6*a;*

DETAILED DESCRIPTION OF THE INVENTION

In the present application, the terms "vertical" and "horizontal", "top" and "bottom" as well as terms derived therefrom such as "above" and below" refer to an arrangement of the pipette tip with a vertically oriented middle axis of the tubular body, wherein the top opening is at the top and the bottom opening is at the bottom.

Figures 1A, 1B, 1C:
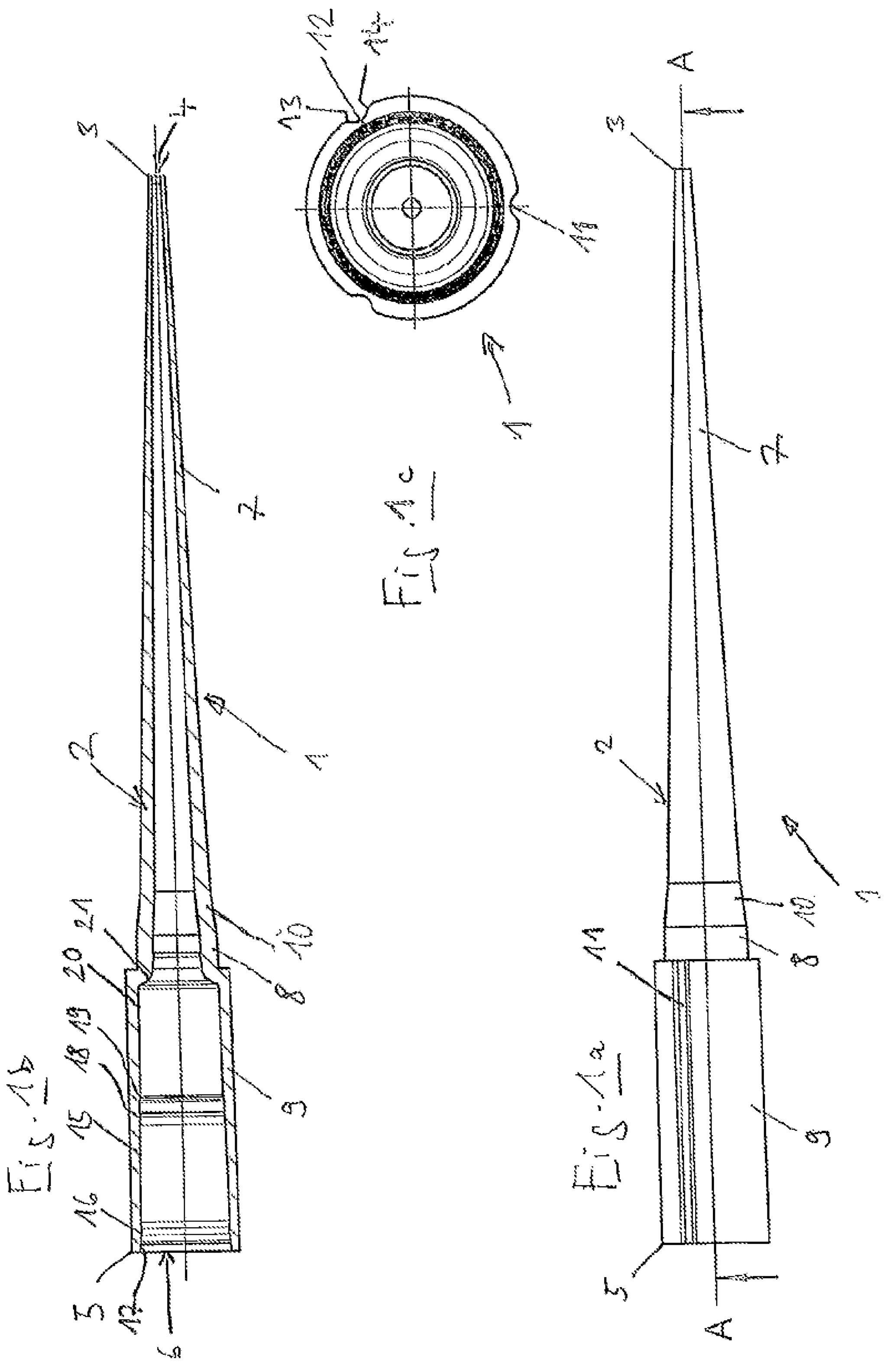
FIG. 1*a* illustrates a side view of an embodiment of a pipette tip with a 20 μL nominal volume.
FIG. 1*b* illustrates a cross sectional view of the embodiment of the pipette tip of FIG. 1*a;*
FIG. 1*c* illustrates an enlarged plan view of the embodiment of the pipette of FIG. 1*a;*

According to FIGS. 1-2, a pipette tip 1 has an elongated tubular body 2 that has a bottom opening 4 in the bottom end 3 and a top opening 6 in the top end 5. The bottom opening 4 is smaller than the top opening 6.

In general, the inner and the outer diameter of the tubular body 2 increase from the bottom opening 4 to the top opening 6. The tubular body 2 has a conical initial section 7 at the bottom, above that a middle section 8 with a smaller cone angle than the initial section 7, and above that a cylindrical head section 9 with larger outer dimensions than the middle section 8. Adjacent to the middle section 8, a downwardly directed outer shoulder runs externally around the bottom side of the head section 9.

According to FIGS. 1*a*-*d*, the conical initial section 7 is connected by a thicker conical transitional section 10 to the middle section 8 of the pipette tip 1. According to FIGS. 2*a*-*d,* the comparatively short conical initial section 7 is connected directly to the comparatively long middle section 8 of the pipette tip 1. The wall thickness of the initial section 7 and the transitional section 10 (only of the pipette tip from FIGS. 1*a*-*d*) increase slightly from bottom to top.

Grooves 11 extended in an axial direction are present in the outer circumference of the head section. The grooves 11 extend over the entire length of the head section 9, i.e., from the top end to the bottom end of the head section 9. They are oriented parallel to the middle axis of the tubular body 2. Each pipette tip 1 has three grooves 11 that are evenly distributed over the outer circumference of the head section 9.

Each groove 11 has a rounded profile in cross-section. At the base, the groove 11 has a first radius 12 with the midpoint being outside of the tubular body 2. The first radius 112 smoothly transitions on both sides into a second radius 13, 14 with the midpoint being within the tubular body 2. Each second radius 13, 14 smoothly transitions on the outside into the cylindrical outer contour of the head section 9.

Next to the top opening 6, the tubular body 2 has a seat region 15 for a conical attachment of a pipetting device. The seat region 15 extends into the head section 9 and is conical with a cone angle of 2°. The tubular body 2 has an inwardly projecting, circumferential sealing bead 16 on the inner circumference of the seat region 15. The sealing bead 16 forms the top end of the seat region 15. An insertion chamfer 17 with a conical contour extends from the top opening 6 to the sealing bead 16. The cone angle of the insertion chamfer 17 is 16°.

The distance of the sealing bead 16 from the top opening is 0.8 mm. The sealing bead 16 projects 0.05 mm from the seat region 15.

At a further distance from the top opening 6, the tubular body has an inwardly projecting closed circumferential guide structure 18 in the form of a guide bead. The guide structure 18 has a distance of 5.3 mm from the top opening 6. The guide bead 18 projects 0.03 mm from the seat region 15. Alternatively instead of the circumferential guide structure 18, intermittent or sectional circumferential guide structures are present, for example three guide cams distributed evenly over the niter circumference of the seat region 15.

Below the guide structure 18, a conical brake region 19 is present on the inner circumference of the head section 9. The cone angle of the brake region 19 is 40°.

Below the brake region 19, a cylindrical cavity 20 is in the head section 9. The cavity 20 can in principle remain free.

With the design as a filter pipe tip, one or more filter discs are pressed into the cavity 20 or held in another way.

At the bottom end of the cylindrical cavity 20, there is an inwardly projecting, upwardly directed and circumferential inner shoulder 21. The inner shoulder 21 transitions via a rounded contour into the middle section 8.

At the base of the grooves 11, the tubular body has a wall thickness of at most 0.2 mm in a horizontal plane through the sealing bead 16, and a greater wall thickness of at least 0.25 mm in the same plane next to the grooves 11. In the example, the wall thickness is 0.2 mm at the base of the grooves and 0.4 mm next to the grooves.

The pipette tips 1 are preferably made of polypropylene.

Figure 3:
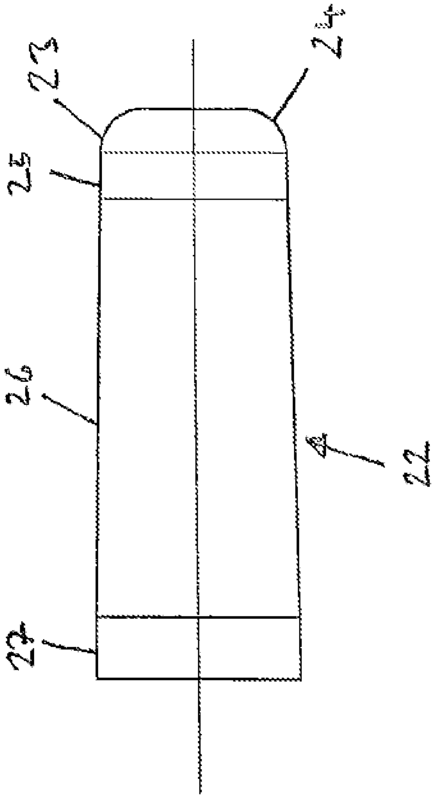
FIG. 3 illustrates a side elevation view of an embodiment of an attachment for mounting an embodiment of a pipette tip.
Figures 4A, 4B, 4C:
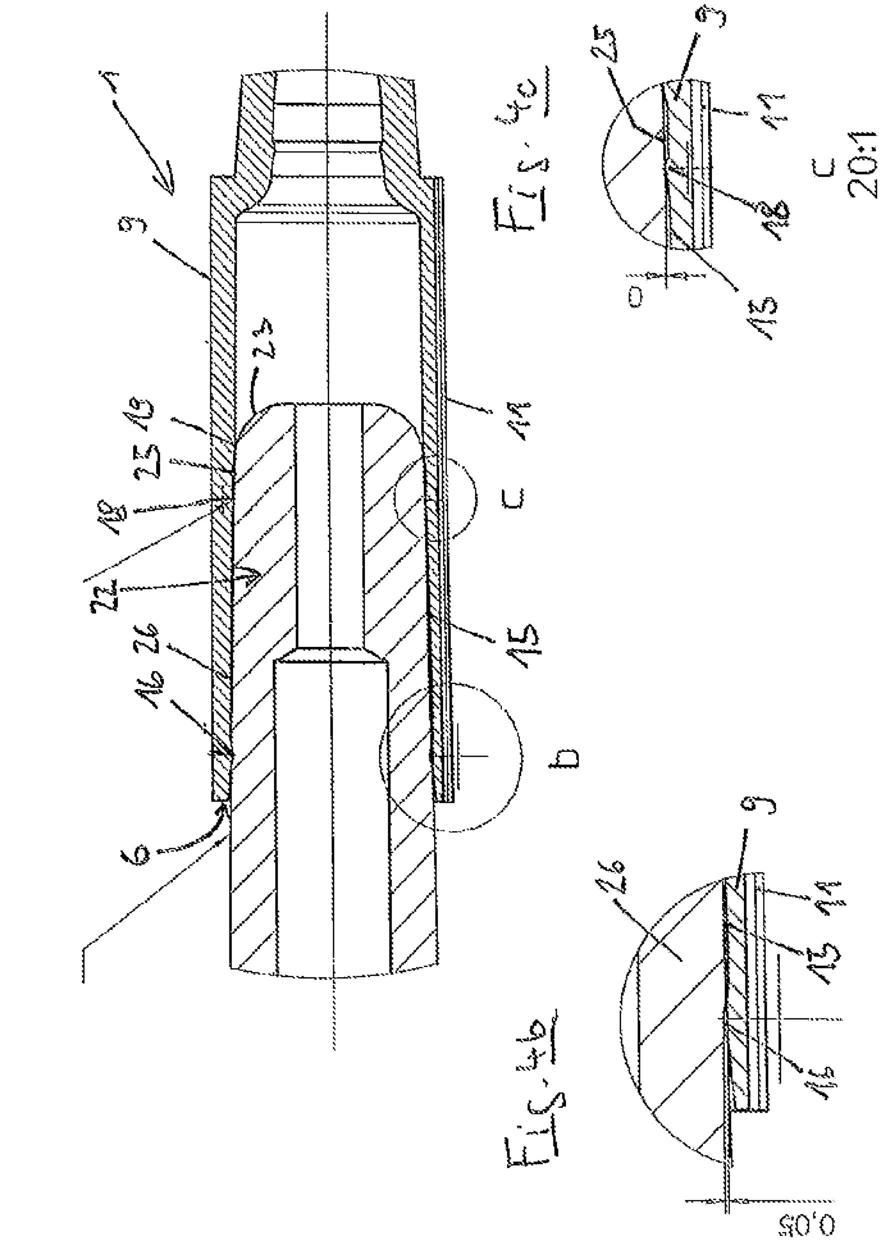
FIG. 4*a* illustrates a partial view of an embodiment of the pipette tip with a nominal volume of 20 μL mounted on an embodiment of the attachment.
FIG. 4*b* illustrates an enlarged view of a portion of the embodiment of FIG. 4*a;*
FIG. 4*c* illustrates art enlarged view of a portion of the embodiment of FIG. 4*a;*
Figure 4D:
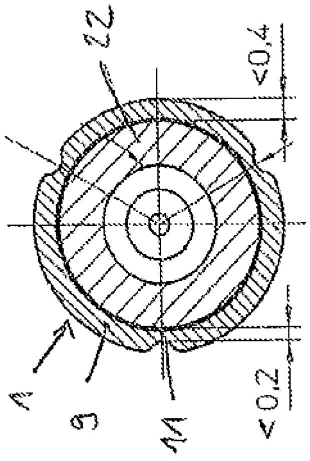
FIG. 4*d* illustrates a horizontal sectional view of the embodiment of FIG. 4*a;*

According to FIG. 3, an attachment 22 has a rounded insertion section 23 with a circumferential radius 24 of 0.8 mm and a maximum diameter of 3.34 mm, next to which is a guide section 25 with a small cone angle of 2° and a maximum diameter of 3.4 mm, next to which is a clamping section 26 with the same cone angle and a maximum diameter of 3.68 mm, and next to which is a cylindrical bearing section 27. The attachment is preferably made of stainless steel or high-strength and rigid plastic, for example of a Duroplast.

The attachment 22 can be inserted through the top opening 6 into the pipette tip 1 up to the position shown in FIGS. 4*a*-4*d*. in this position, the insertion section 23 is shoved against the brake region 19, the guide bead 18 lies against the guide section 25, and the sealing bead 16 lies against the clamping section 26. This expands the inner diameter in the seat region 15. The expansion is based on a plastic deformation of the wall of the pipette tip 1 within at least one groove 11. An additional elastic deformation is possible.

Figure 5B:
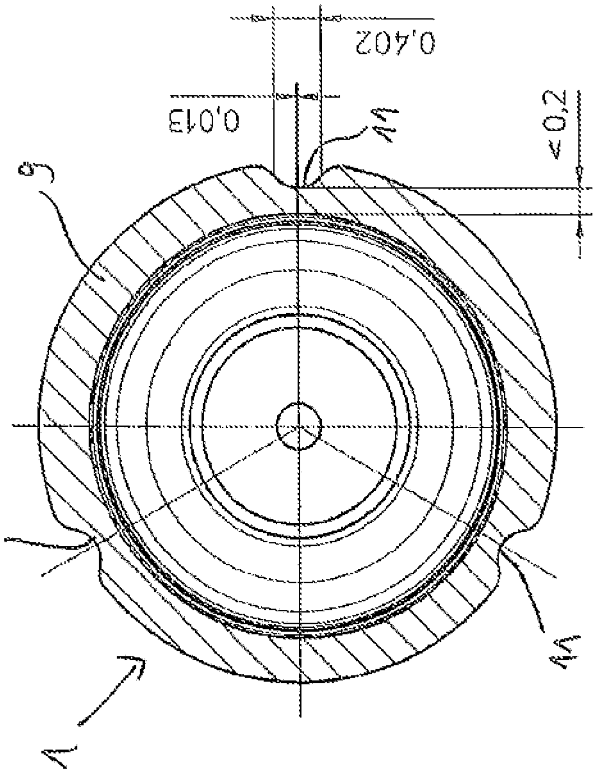
FIG. 5*b* illustrates a horizontal sectional view of the embodiment of the pipette tip of FIG. 5*a* after plastic deformation within a groove.
Figure 5A:
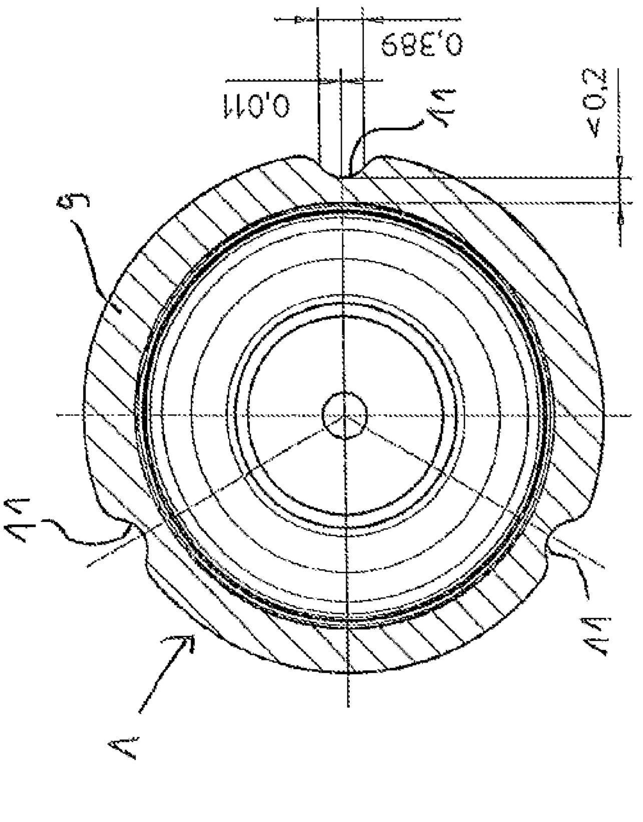
FIG. 5*a* illustrates an embodiment of the pipette tip before being mounted on the attachment.

According to FIGS. 5*a* and 5*b,* a strip originally 0.011 mm wide at the base of the groove 11 is plastically expanded to a width of 0.013 mm by the plastic deformation. Between the turning points of the groove profile toward the groove flanks, the groove 11 is plastically expanded from 0.389 mm to 0.402 mm.

It was observed that the plastic deformation is generally restricted to one of the three grooves 11. Apparently this is because the core of the injection mold is displaced slightly out of the center of the cavity while injection molding the pipette tip 1 so that the wall thickness in the region of the grooves 11 is slightly different. The displacement out of the center is apparently because of the stagnation pressure of the plastic material flowing laterally into the cavity.

Due to the plastic deformation when clamping the pipette tip 1 onto the attachment 22, the clamping force is limited to a value sufficient for the seal and a tight seat of the pipette tip 1 on the attachment 22.

The contact of the guide bead 18 with the guide section 25 prevents a lateral deflection of the pipette tip 1 and thereby a loosening of its seat on the attachment 22, in particular with wall dispensing.

The brake region 19 gently brakes the shoving of the pipette tip 1 onto the attachment 22, whereby when several pipette tips are picked up simultaneously from a tray or rack by means of a multichannel pipetting device, a sufficiently tight and sealing seat of all pipette tips on all attachments is promoted.

According to FIGS. 6*a*-*b*, the pipette tip 1 of PP is pressed by a specific clamping force onto an attachment 22 of stainless steel with a polished surface to check the plastic deformation. The mounting force is limited by a helical spring 28 by means of which the attachment 22 is braced against an abutment 29. To apply the mounting force, a stopper 30 that accommodates the bottom end of the pipette tip 1 and that closes the bottom opening airtight can be pushed downward toward the attachment 22. The attachment 22 is held, in a mounting plate 31 that is braced against the top side of the helical spring 28. The helical spring 28 is adjusted so that it compresses at a mounting force of 3 N. The attainment of the mounting force of 3 N can he recognized by the compression of the attachment 22, or respectively the mounting plate 31. In addition, the abutment 29 can be tightly connected to a stop plate 32 that is arranged above the mounting plate 31 and on which the top end of the pipette tip is placed when a mounting force of 3 Newtons is reached. This limits the mounting force to 3 Newtons. The pipette tip 1 is sealingly clamped onto the attachment 22 by this mounting force. The pipette tip 1 has plastically deformed in the base of a groove 11. This can be determined by marking a strip on the base of the groove and measuring the strip width before and after mounting the pipette tip on the attachment 22.

In addition, this seal can be checked in this arrangement. To do this, the pipette tip 1 is closed airtight at its bottom opening 4, and a vacuum is applied to its top opening 6.

Figure 7A:
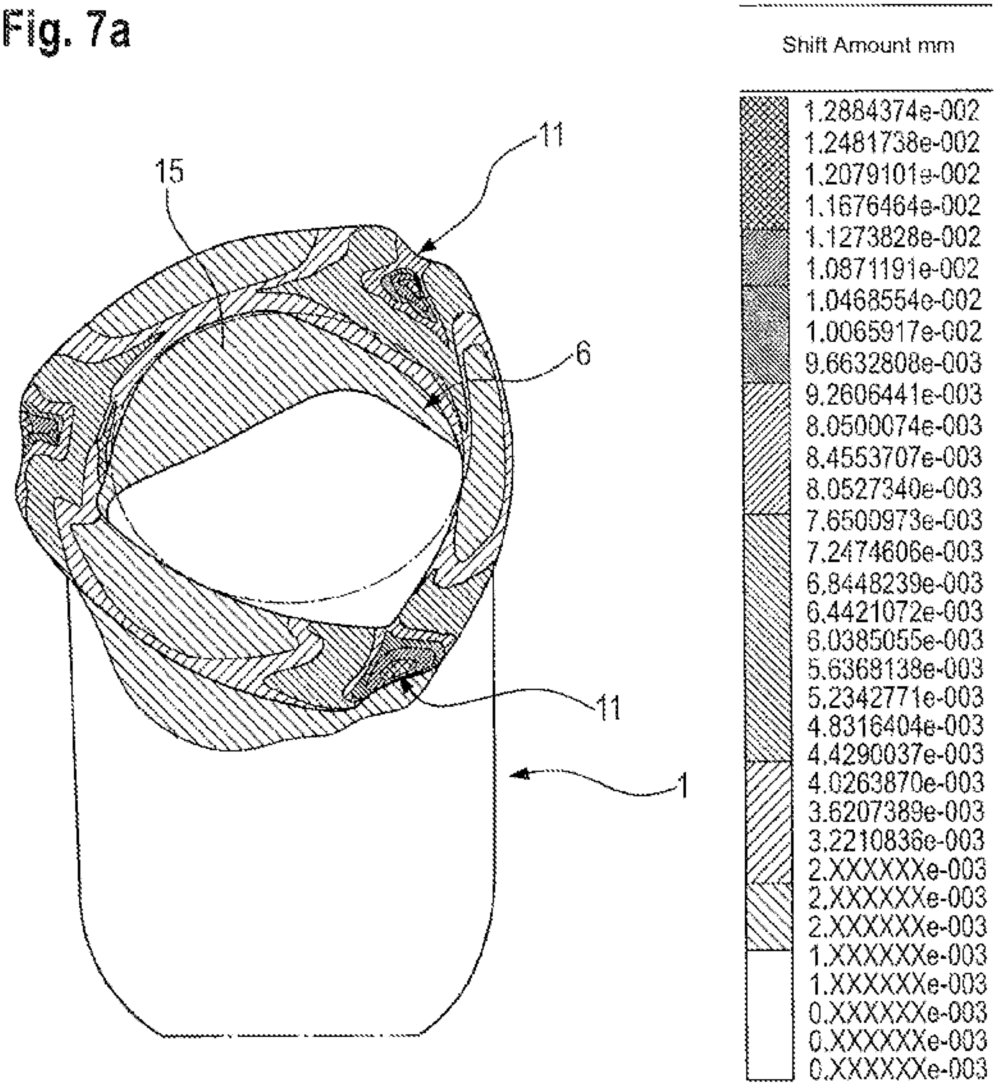
FIG. 7*a* illustrates visual results of an FEM deformation calculation of an embodiment of the pipette tip with grooves in the outer circumference.
Figure 7B:
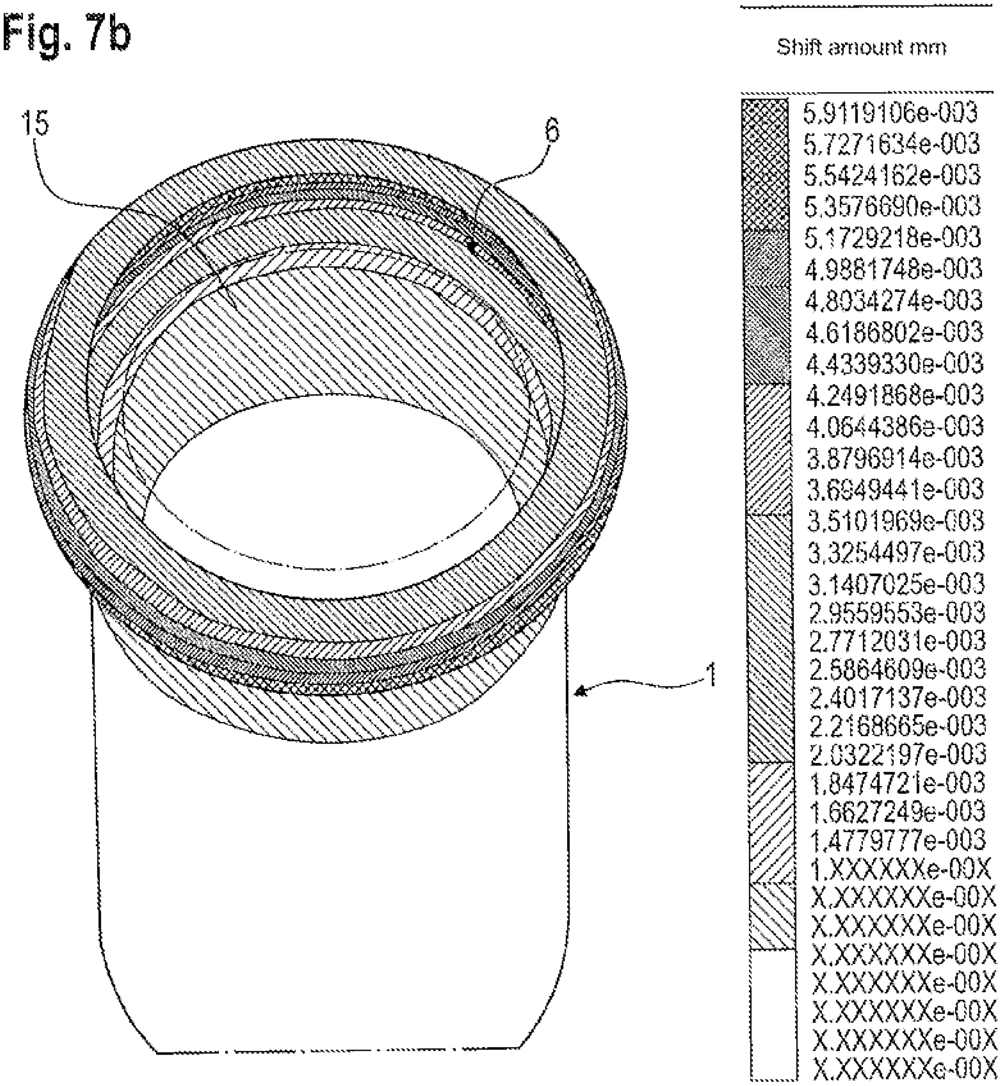
FIG. 7*b* illustrates visual results of an FEM deformation calculation of an embodiment of a conventional pipette tip without grooves in the outer circumference (FIG. 7*b*)
Figures 8A, 8B, 8C, 8D:
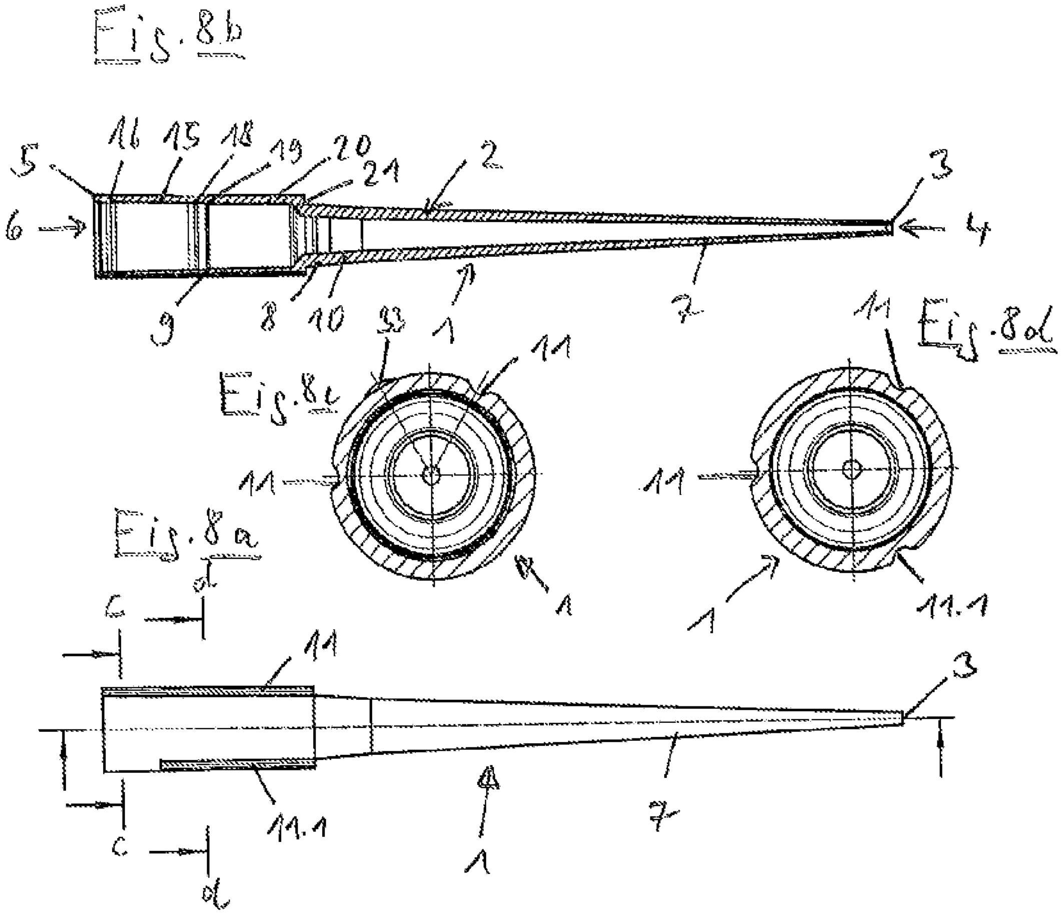
FIG. 8*a* illustrates a side view of an embodiment of the pipette tip with a 20 mL nominal volume including a shorter groove opposite the injection point.
FIG. 8*b* illustrates a longitudinal sectional view of the embodiment of FIG. 8*a;*
FIG. 8*c* illustrates a sectional view along line c-c of the embodiment of FIG. 8*a;*
FIG. 8*d* illustrates a sectional view along line d-d of the embodiment of FIG. 8*a;*
Figure 9B:
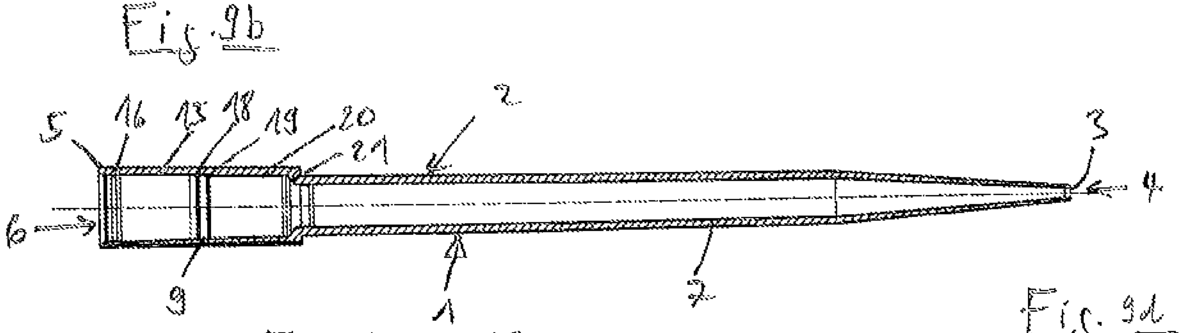
FIG. 9*b* illustrates a longitudinal view of the embodiment of FIG. 9*a;*
Figure 9C:
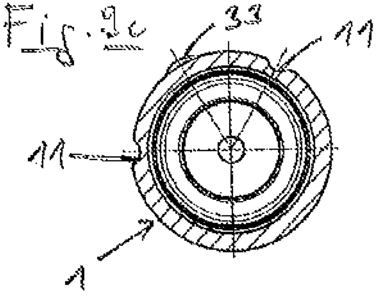
FIG. 9*c* illustrates a sectional view along line c-c of the embodiment of FIG. 9*a*.
Figure 9D:
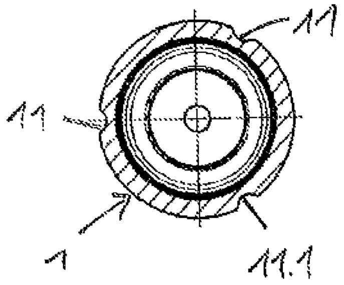
FIG. 9*d* illustrates a sectional view along line d-d of the embodiment of FIG. 9*a*.
Figure 9A:
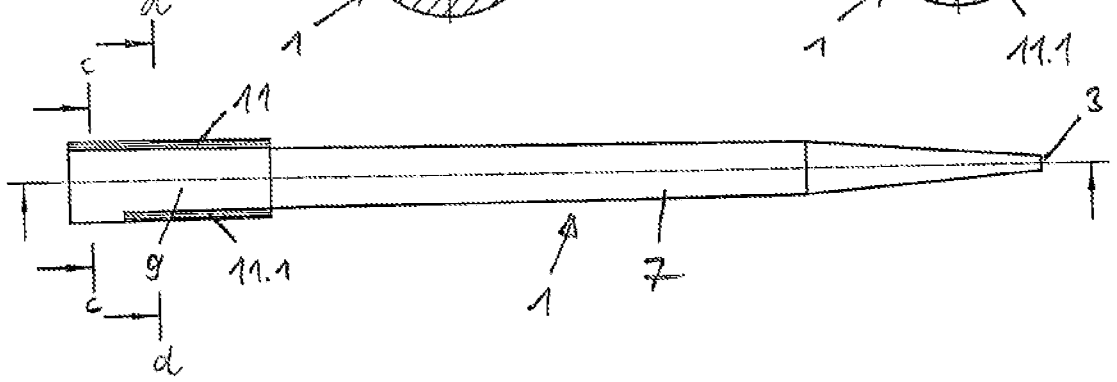
FIG. 9*a* illustrates a side view of an embodiment of the pipette tip with a 100 mL nominal volume including a shorter groove opposite the injection point.

FIGS. 7*a* and *b* show the deformations of a pipette tip 1 according to the invention and a conventional pipette tip 1 with a constant wall thickness in the circumferential direction upon introducing a specific radial force into the seat region 15 according to FEM calculations. The height of the deformation is identified by colors, wherein the values of the deformation are assigned to the colors in the legend. The contours of the deformed pipette tips 1 are depicted graphically exaggerated in color. Additional lines indicate the contours of the undeformed pipette tips 1.

The greatest deformations by the mounting forces acting radially on the seat regions 15 occur in the proximity of the top openings 6 of the pipette tips 1. With the pipette tip 1 according to the invention, they are concentrated on the grooves 11. Since this is a calculation, all of the grooves 11 are equally affected. With the pipette tip 1 according to the invention, the deformations in the grooves are 6.5 times as great as is the case with the conventional pipette tip 1. The deformations within the grooves 11 have plastic and elastic components. Otherwise, the deformations are elastic.

Figures 1D, 2D:
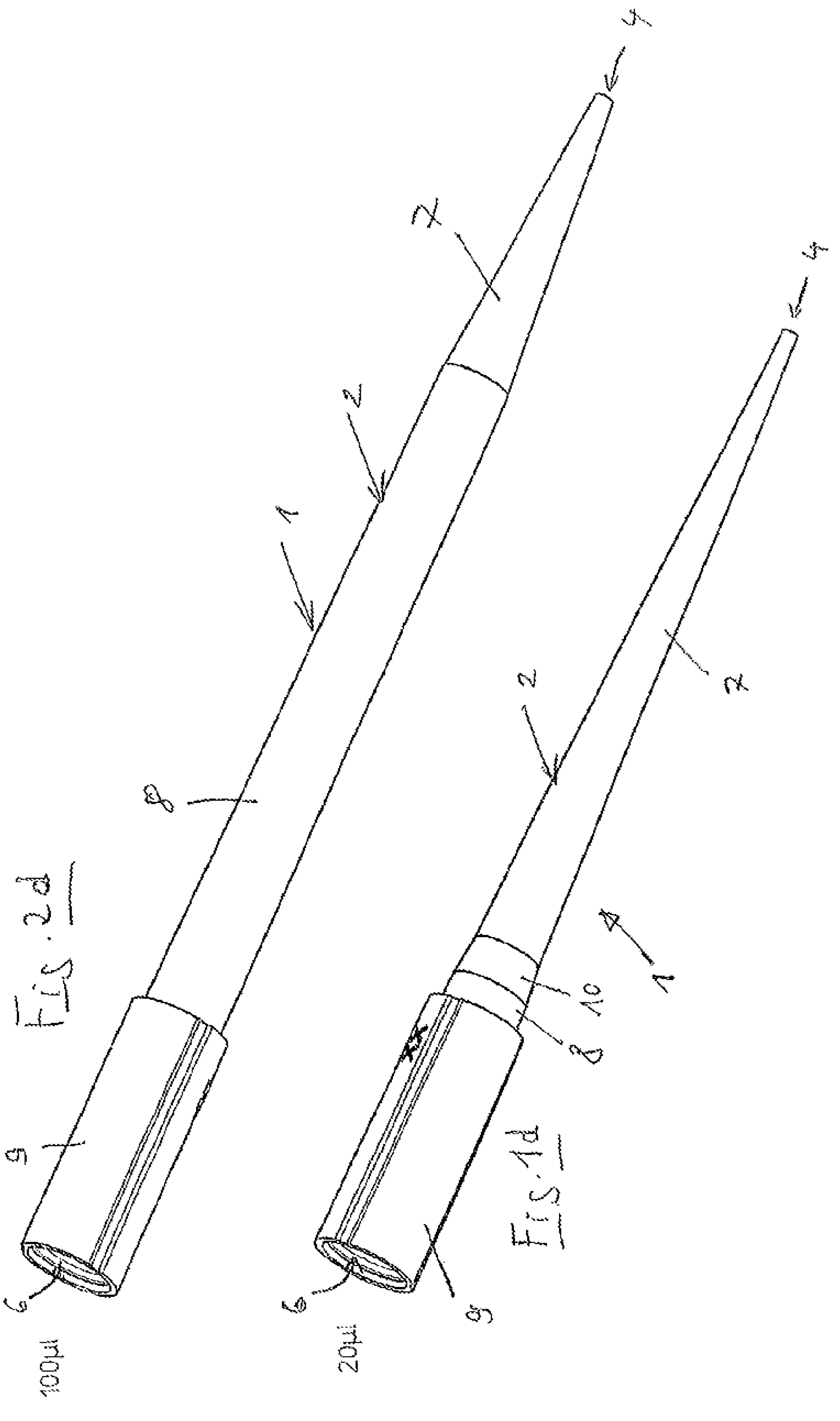
FIG. 1*d* illustrates a side perspective view of the embodiment of the pipette tip of FIG. 1*a;*
FIG. 2*d* illustrates a side perspective view of the embodiment of the pipette tip of FIG. 2*a;*
Figure 2B:
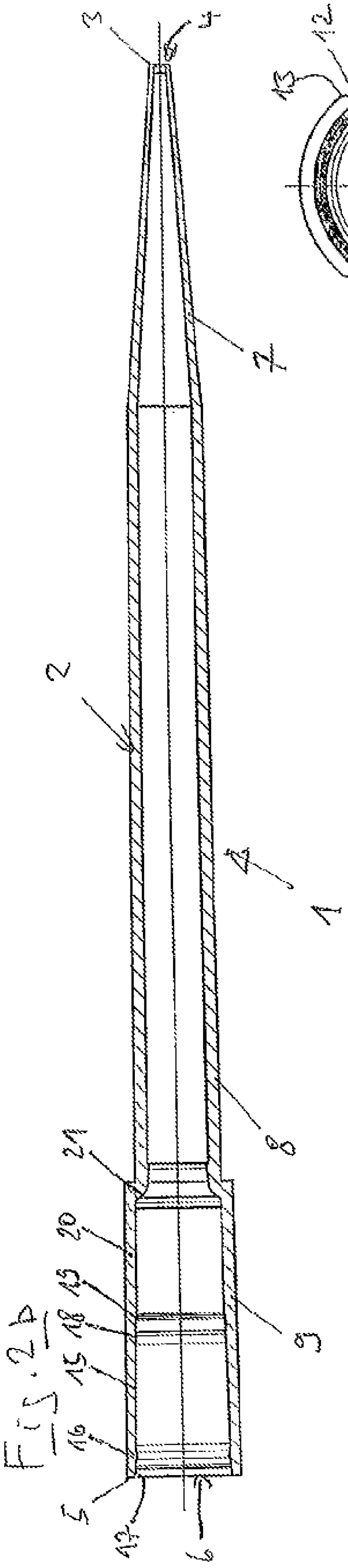
FIG. 2*b* illustrates a cross sectional view of the embodiment of the pipette tip of FIG. 2*a;*
Figure 2C:
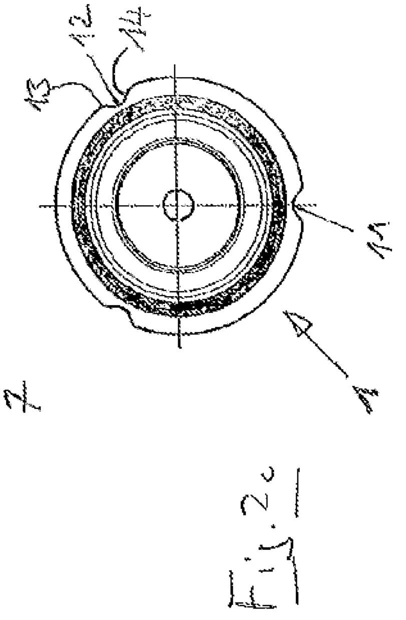
FIG. 2*c* illustrates an enlarged plan view of the embodiment of he pipette of FIG. 2*a;*
Figure 2A:
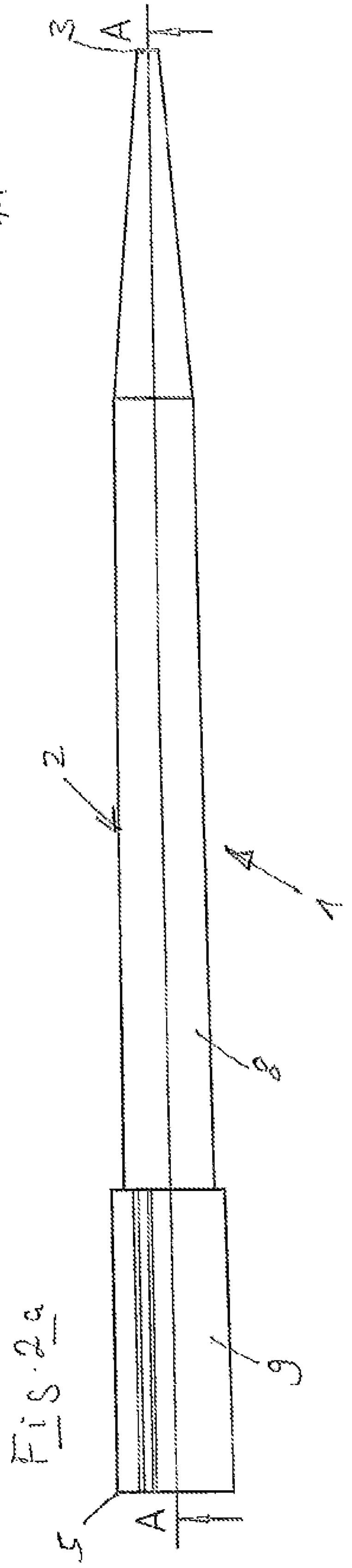
FIG. 2*a* illustrates a side view of an embodiment of a pipette tip with a 100 μL nominal volume.

The pipette tip 1 from FIGS. 8*a*-*d* differs from the pipette tip from FIG. 1, and the pipette tip 1 from FIGS. 9*a*-*d* differs from the pipette tip from FIGS. 2*a*-*d* in that only two grooves 11 extend over the entire length of the head section 9, and the groove 11.1 extends only over part of the length of the head section 9. The top end of the groove 11.1 is namely arranged at a distance from the top end of the pipette tip 1. With this pipette tip, the injection point 33 is arranged precisely in a vertical sectional plane through the middle axis of the pipette tip 1 in which the groove 11.1 also runs. Since the groove 11.1 has a distance from the top edge of the pipette tip 1, the wall of the head section 9 is not weaker diametrically opposite the injection point 33 and in the same horizontal plane. Consequently, the dimensional accuracy, or respectively the roundness of the sealing bead 16 that is located close to the cross-sectional plane of the injection point is not significantly impaired by injection molding.

REFERENCE SIGN LIST

1 Pipette tip
2 Tubular body
3 Bottom end
4 Bottom opening
5 Top end
6 Top opening 7 Initial section
8 Middle section
9 Head section
10 Transitional section
11 Groove
12 First radius
13, 14 Second radius
15 Seat region
16 Sealing bead
17 Insertion chamfer
18 Guide structure
19 Conical brake region
20 Cylindrical cavity
21 Inner shoulder
22 Attachment
23 Insertion section
24 Circumferential radius
25 Guide section
26 Clamping section
27 Cylindrical bearing region
28 Helical spring
29 Abutment
30 Stopper
31 Mounting plate
32 Stop plate
33 Injection point

The invention claimed is:

1. A pipette tip comprising:

a tubular body of a substantially uniform thickness and extending in a longitudinal direction, comprising:
- an inner circumference and an outer circumference;
- a bottom opening defined at a bottom end and configured to enable passage of liquid into and out of the tubular body;
- a top opening defined at a top end for clamping onto an attachment of a pipetting device;
- a seat region positioned proximate the top opening on the inner circumference and configured to engage an attachment of a pipetting device; and
- a plurality of grooves defined in the outer circumference and extending in the longitudinal direction, wherein the tubular body is configured to plastically expand in a circumferential direction within at least one groove upon mounting the seat region on the attachment with a maximum mounting force of 5N, wherein the attachment comprises a larger diameter than at least part of the seat region, wherein an interference fit is formed between the attachment and the at least part of the seat region when the pipette tip is clamped onto the attachment, and wherein the pipette tip is sealingly held on the attachment.

2. The pipette tip according to claim 1, wherein the plurality of grooves extend from the top end of the tubular body in a downward direction towards the bottom end.

3. The pipette tip according to claim 1, wherein the tubular body comprises a maximum wall thickness of 0.2 mm at a base of the plurality of grooves.

4. The pipette tip according to claim 1, wherein the tubular body comprises a wall thickness of at least 0.15 mm at a base of the plurality of grooves.

5. The pipette tip according to claim 1, wherein the tubular body comprises a wall thickness of at least 0.25 mm in a radial direction proximate the at least one groove.

6. The pipette tip according to claim 1, wherein the tubular body comprises an insertion chamfer at the top opening on the inner circumference.

7. The pipette tip according to claim 1, wherein the tubular body is produced from a thermoplastic.

8. The pipette tip according to claim 1, wherein the tubular body comprises at least three grooves defined on the outer circumference of the tubular body.

9. The pipette tip according to claim 8, wherein the at least three grooves are evenly distributed over the outer circumference of the tubular body.

10. The pipette tip according to claim 1, wherein the plurality of grooves extend from a top groove end positioned below a sealing bead running around the inner circumference at the seat region.

11. The pipette tip according to claim 10, wherein the plurality of grooves is not positioned diametrically opposite an injection point, and wherein the top groove end are not positioned below a sealing bead running around the inner circumference of the seat region.

12. The pipette tip according to claim 1, further comprising:
- a conical initial section comprising a cone angle,
- a conical middle section positioned above the conical initial section and comprising a cone angle that is less than the cone angle of the conical initial section,
- a conical head section positioned above the conical middle section, and
- a transitional section positioned between the conical initial section and the conical middle section, wherein the transition section comprises a greater cone angle than the cone angle of the conical initial section.

13. The pipette tip according to claim 12, wherein the plurality of grooves are positioned on the outer circumference of the conical head section, and wherein the seat region is positioned on an inner circumference of the conical head section.

14. The pipette tip according to claim 1, wherein the tubular body comprises an inwardly projecting circumferential sealing bead on the inner circumference at the seat region.

15. The pipette tip according to claim 14, wherein the sealing bead is positioned at a distance from the top opening.

16. The pipette tip according to claim 14, wherein the tubular body further comprises a downwardly tapering conical brake region on the inner circumference at the seat region and positioned below the sealing bead.

17. The pipette tip according to claim 14, further comprising a guide structure configured to laterally brace the pipette tip against the attachment.

18. The pipette tip according to claim 17, wherein the guide structure projects from the inner circumference at the seat region a distance that is at least equal to a diameter of the sealing bead.

19. A pipetting system comprising:
- a pipetting device comprising at least one attachment; and
  - at least one pipette tip, the at least one pipette tip comprising,
  - a tubular body comprising a substantially uniform thickness and extending in a longitudinal direction, the tubular body comprising,
  - an inner circumference and an outer circumference,
  - a bottom opening defined at a bottom end and configured to enable passage of liquid into and out of the tubular body,
  - a top opening defined at a top end and configured to clamp onto the at least one attachment of a pipetting device, a seat region positioned proximate the top opening on the inner circumference and configured to engage the at least one attachment of the pipetting device, and a plurality of grooves defined in the outer circumference and extending in the longitudinal direction; and wherein the tubular body of the at least one pipette tip is configured to plastically expand in a circumferential direction within at least one groove upon mounting the seat region on the at least one attachment with a maximum mounting force of 5N, wherein the at least one attachment comprises a larger diameter than at least part of the seat region form an interference fit with the at least part of the seat region when the at least one pipette tip is clamped onto the at least one attachment, and wherein the at least one pipette tip is sealingly held on the at least one attachment.

* * * * *